April 9, 1946.　　F. O. LUENBERGER　　2,398,235
VARIABLE RATIO TRANSMISSION
Filed Dec. 2, 1941　　12 Sheets-Sheet 4

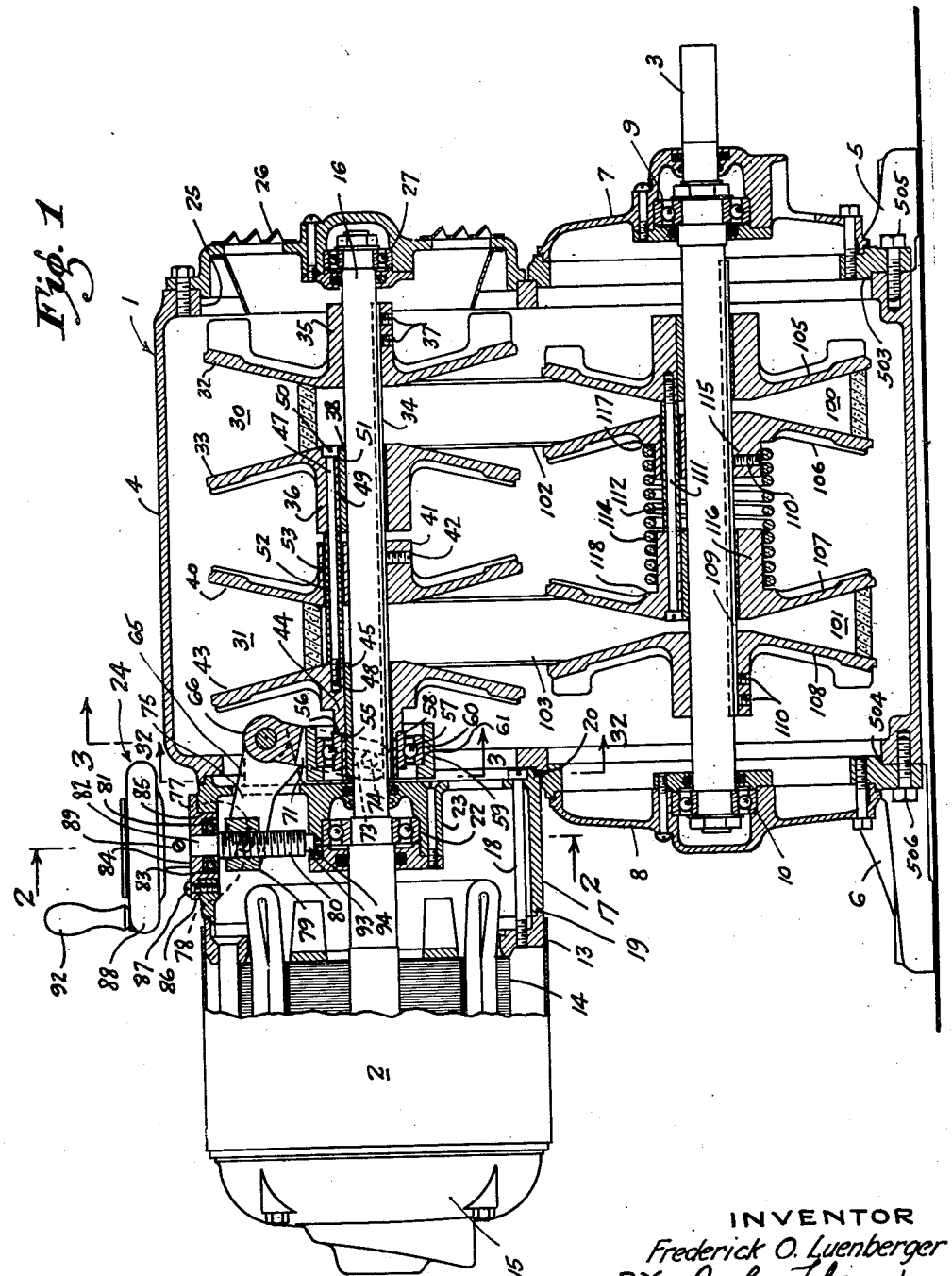

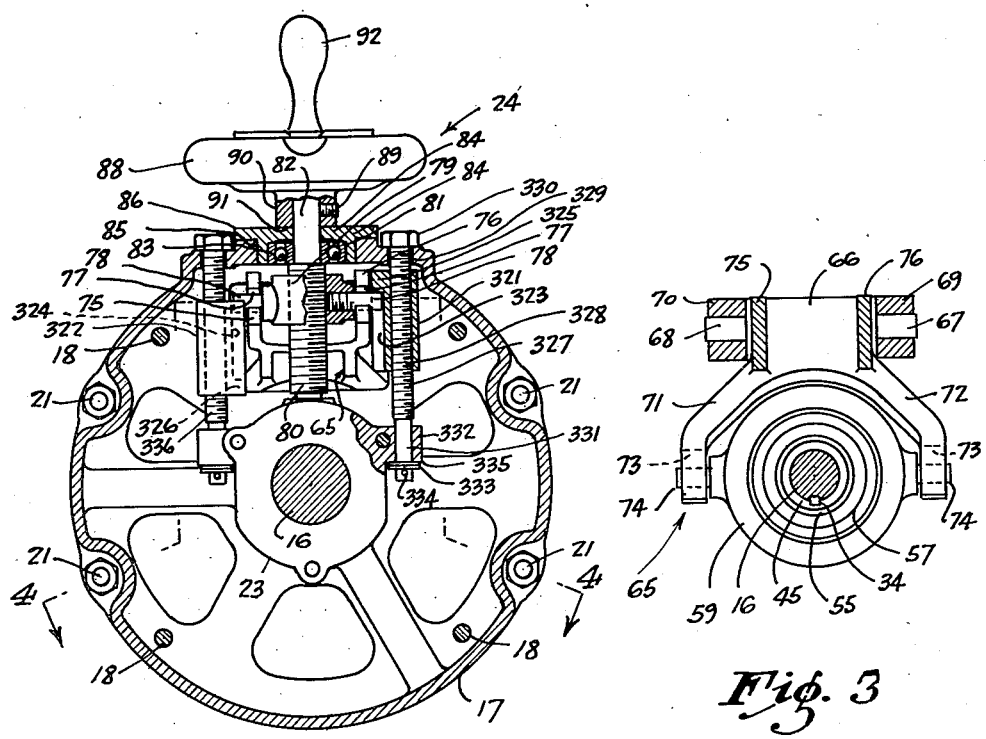
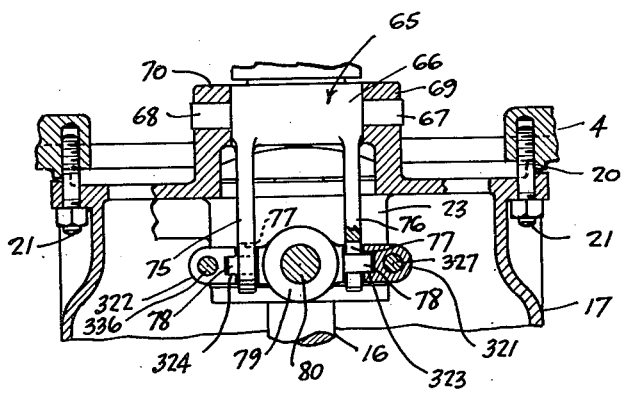

INVENTOR
Frederick O. Luenberger
BY John Flam
ATTORNEY

April 9, 1946.   F. O. LUENBERGER   2,398,235
VARIABLE RATIO TRANSMISSION
Filed Dec. 2, 1941    12 Sheets-Sheet 5
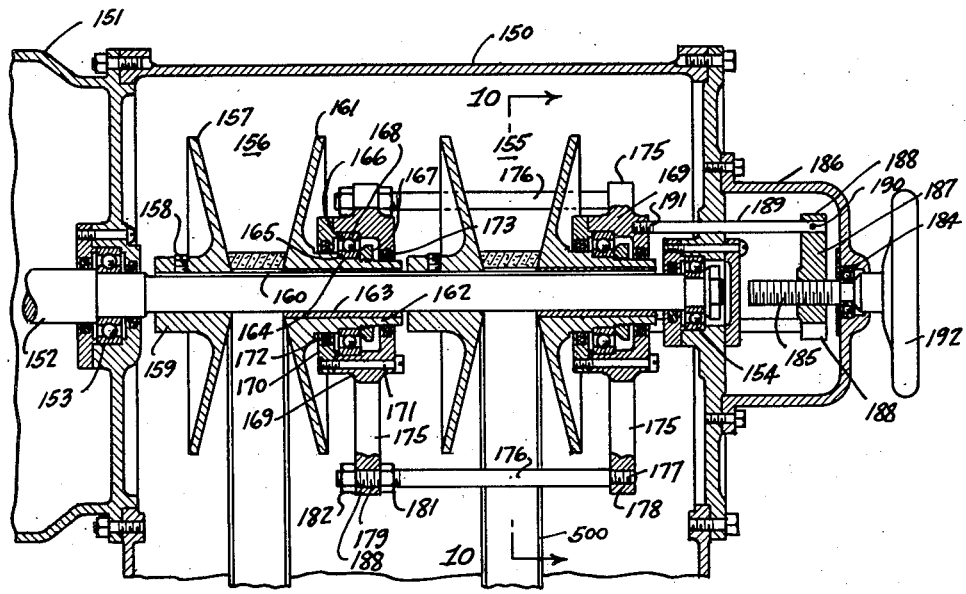
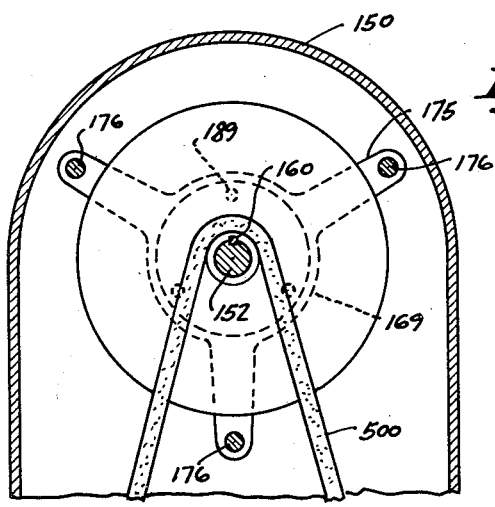
INVENTOR
Frederick O. Luenberger
BY John Flam
ATTORNEY April 9, 1946.   F. O. LUENBERGER   2,398,235
VARIABLE RATIO TRANSMISSION
Filed Dec. 2, 1941   12 Sheets-Sheet 6
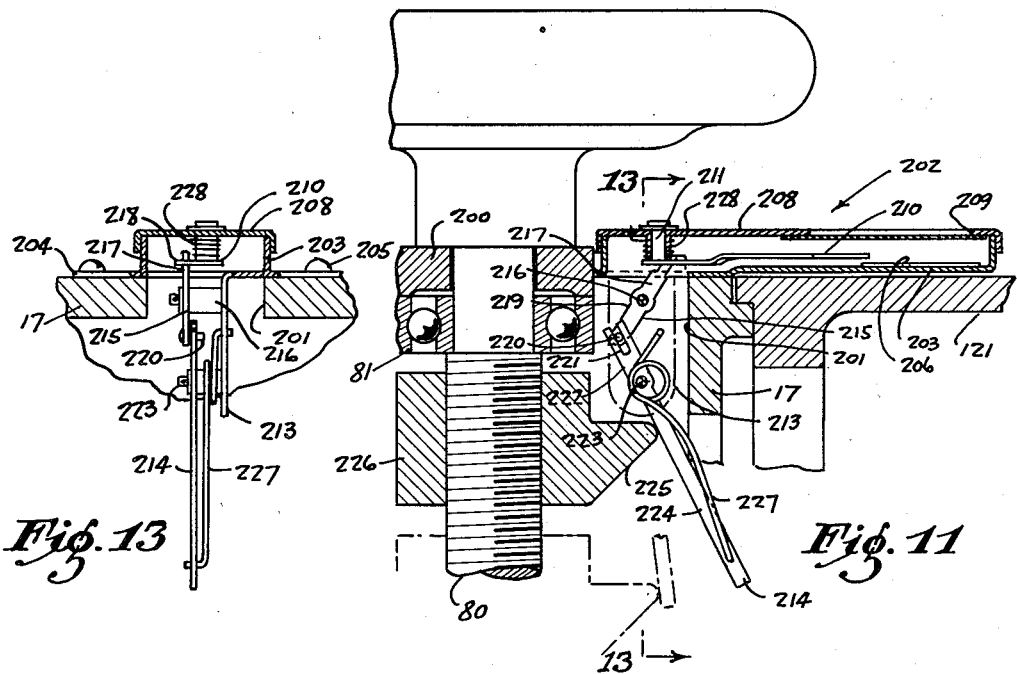
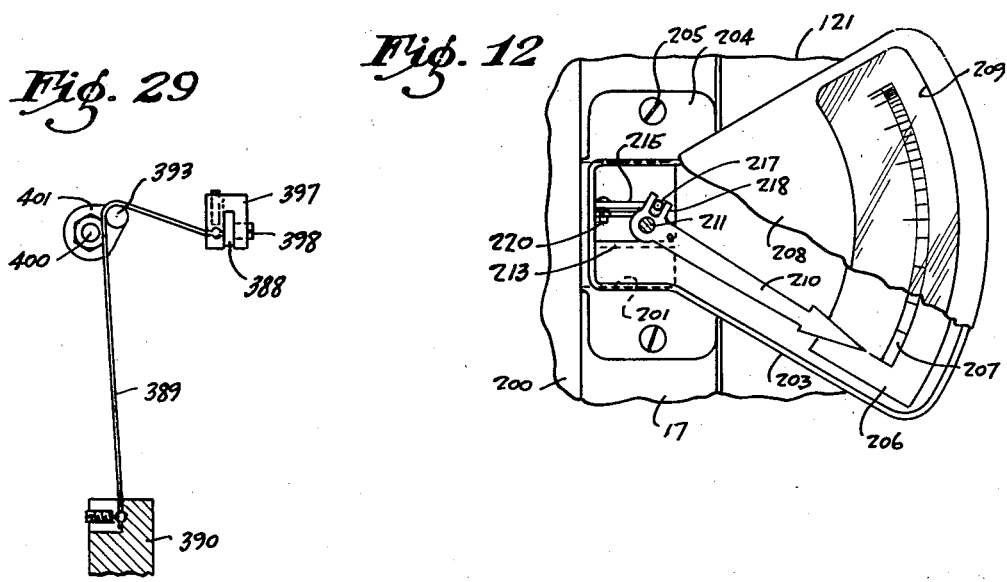
INVENTOR
Frederick O. Luenberger
BY John Flam
ATTORNEY April 9, 1946.   F. O. LUENBERGER   2,398,235
VARIABLE RATIO TRANSMISSION
Filed Dec. 2, 1941   12 Sheets-Sheet 8

INVENTOR
Frederick O. Luenberger
BY John F. Lam
ATTORNEY

April 9, 1946. F. O. LUENBERGER 2,398,235
VARIABLE RATIO TRANSMISSION
Filed Dec. 2, 1941 12 Sheets-Sheet 9
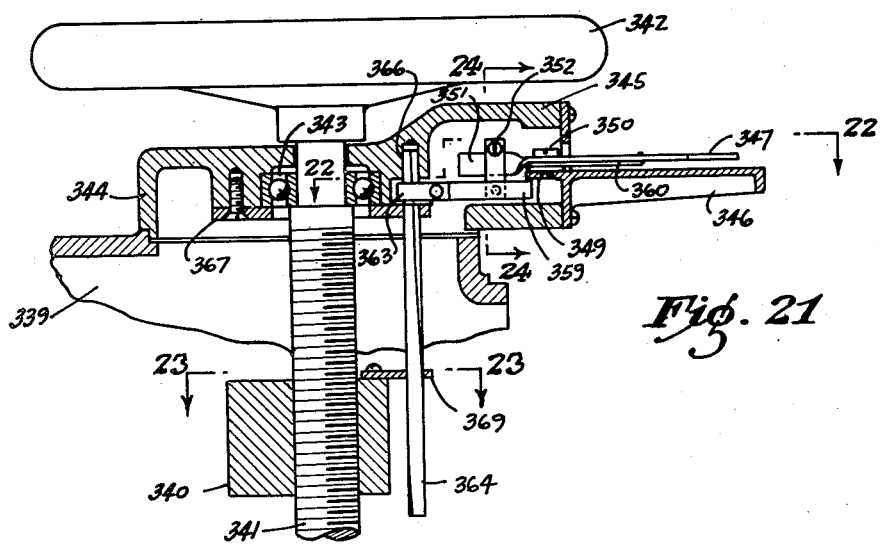
Fig. 21
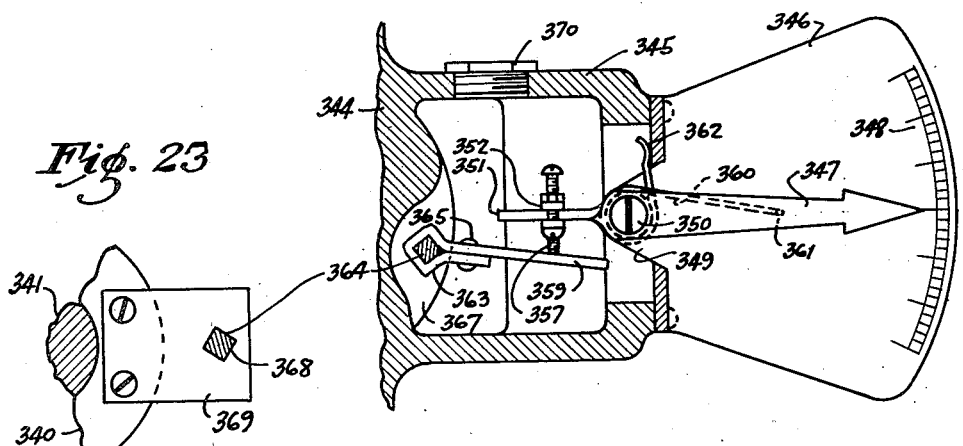
Fig. 23
Fig. 22
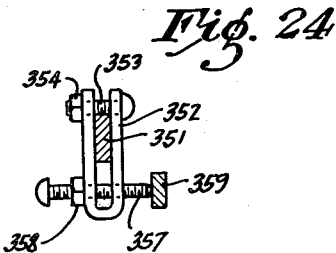
Fig. 24
INVENTOR
Frederick O. Luenberger
BY John Flam
ATTORNEY April 9, 1946.  F. O. LUENBERGER  2,398,235
VARIABLE RATIO TRANSMISSION
Filed Dec. 2, 1941  12 Sheets-Sheet 10
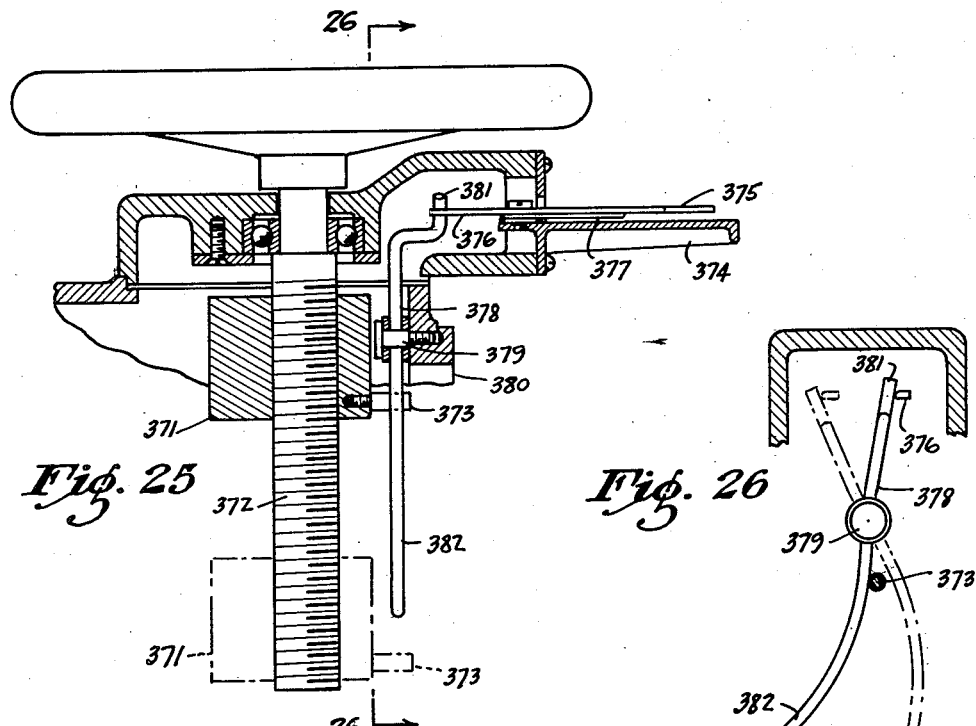
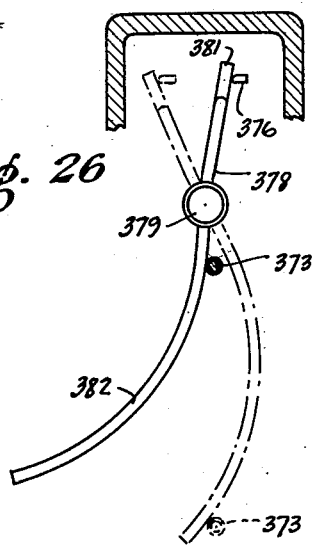
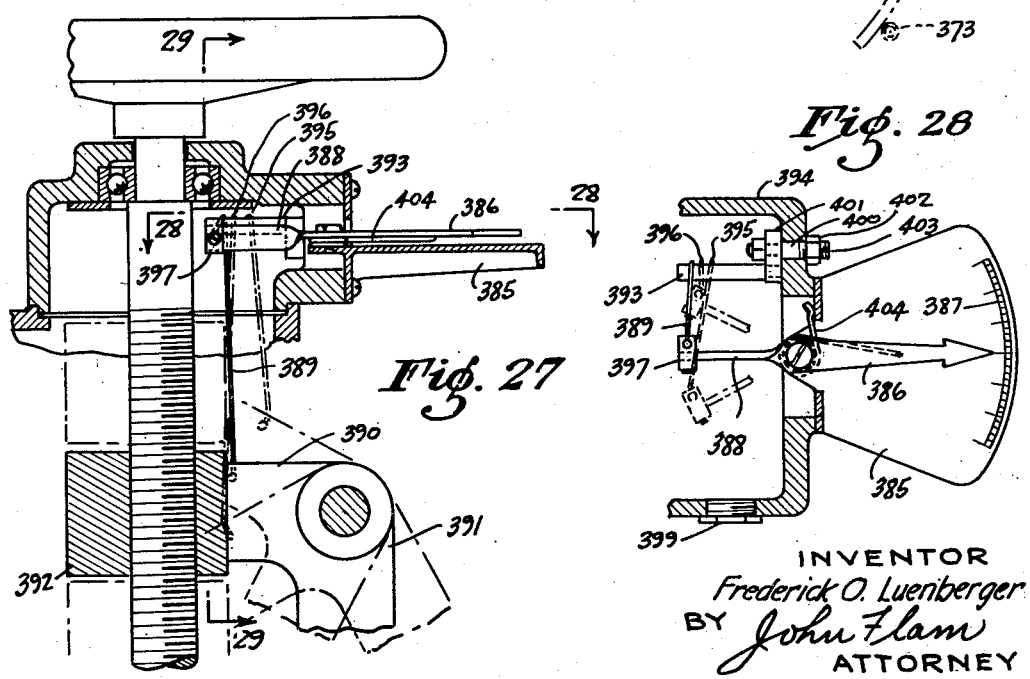
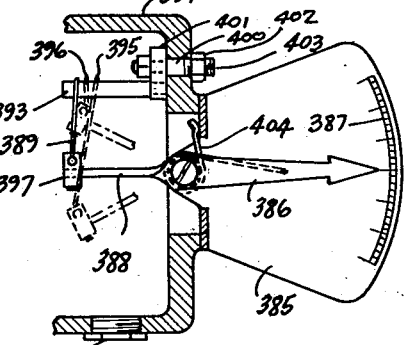
INVENTOR
Frederick O. Luenberger
BY John Flam
ATTORNEY April 9, 1946.  F. O. LUENBERGER  2,398,235
VARIABLE RATIO TRANSMISSION
Filed Dec. 2, 1941  12 Sheets-Sheet 12
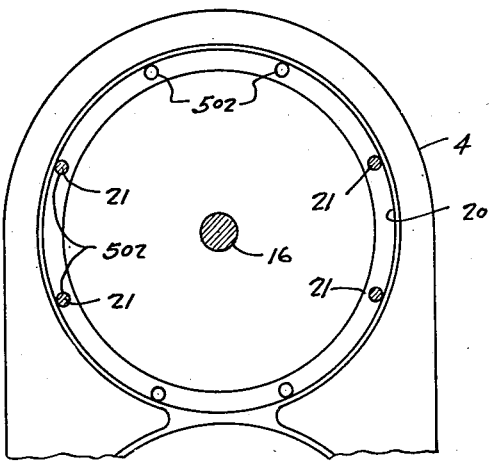
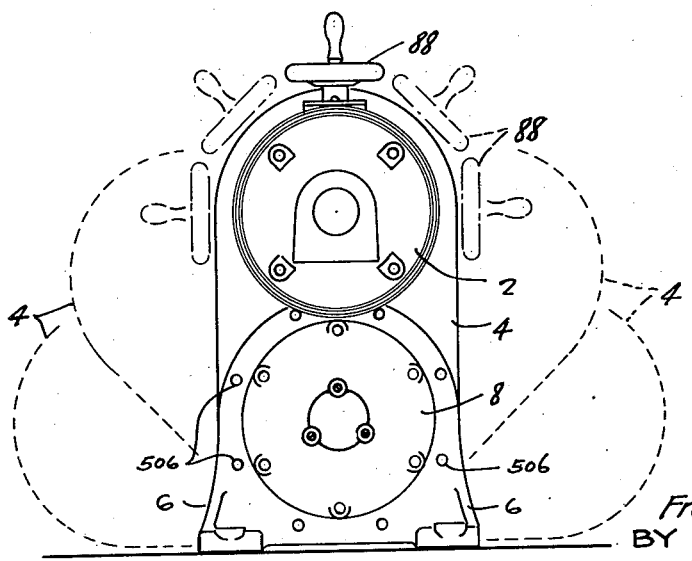

Patented Apr. 9, 1946

2,398,235

UNITED STATES PATENT OFFICE 2,398,235

VARIABLE RATIO TRANSMISSION

Frederick O. Luenberger, Los Angeles, Calif., assignor to U. S. Electrical Motors, Inc., Los Angeles, Calif., a corporation of California Application December 2, 1941, Serial No. 421,318

10 Claims. (Cl. 74—230.17)

This invention relates to an adjustable ratio transmission mechanism in which a wedge shaped or V-type belt cooperates with a pair of pulley structures, each of which has a pair of oppositely directed coned pulley sections for engaging opposite sides of the belt. The sections of at least one of the pulley structures are relatively axially adjustable, means being provided to adjust the relative axial positions of these sections. Thus, with the transmission in operation, if the pulley sections are moved apart, the pull on the belt causes the belt to move radially inwardly to a smaller effective pulley diameter on the pulley faces until it is stopped by the wedging action of its sides against the pulley faces. Conversely, if the pulley sections are urged toward each other, the pressure exerted by the coned pulley faces on the inclined sides of the belt produces a force urging the belt radially outward to a greater effective pulley diameter. All this is well understood.

It is known to use a lead screw and follower nut arrangement to adjust such a pulley structure, a hand wheel or the like being provided on the outside of the transmission frame for operating the screw. It is an object of this invention to provide an improved form of such adjusting mechanism. With such prior arrangements, the hand wheel has been frequently in a rather inaccessible position on the transmission frame or housing; alternatively the hand wheel was placed in any desired place but this involved additional mechanism, such as a chain and sprockets, or rotatable rods coupled by universal joints, to connect the hand wheel to the adjusting screw.

It is an object of the present invention to provide a transmission of this character having an adjusting mechanism such that the operating hand wheel is in an accessible position with respect to the frame, and without the need of providing a special connecting apparatus therefor.

It is frequently necessary as in the case of heavy power requirements to provide a transmission using a plurality of belts. In this case, the adjustable pulley sections must obviously be so connected as to move simultaneously. This has been done by connecting the corresponding pulley sections by means of bolts and separators, spaced as closely to the pulley shaft as possible, clearance openings being provided in the intervening sections to accommodate such connecting means. Such an arrangement has the serious drawback of limiting the minimum effective diameter to which the structure may be adjusted, which in turn reduces the range of speed variation obtainable with a given pulley size, or necessitates large diameter pulleys to obtain the desired range of speed variation.

It is thus another object of this invention to provide an improved multiple belt pulley structure, which it is possible to so adjust that the minimum effective diameter is not limited by the connections between alternate pulley sections.

In such transmissions utilizing either single or multiple belts, it is common to provide for cooperation with the positively adjusted pulley structure, another adjustable diameter pulley structure placed in driving relation to each other by a V-belt. Said other pulley structure is often of the type in which the sections are urged toward each other by spring pressure. Thus, as the positively adjusted sections are moved to approach each other to increase the effective diameter, the increased belt pull forces the spring pressed sections of the other pulley structure apart to give a correspondingly decreased effective diameter. And conversely, if the positively adjusted sections are moved apart to give a reduced effective diameter, the spring forces the other sections together to maintain the belt tight, and increasing the effective diameter of the structure.

Since such spring pressure must be sufficient to prevent the normal belt pull from urging the pulley sections apart, it is apparent that a large spring pressure is necessary in the case of a multiple belt pulley. It is thus still another object of this invention to provide a spring pressed multiple belt adjustable diameter pulley structure which permits the use of a large spring and at the same time is simple and of small space requirements.

It is a still further object of this invention to provide an improved and simplified form of speed indicator which is self-contained and requires no connections to any of the adjustable structure.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

Figure 1 is a transverse axial section through an adjustable ratio transmission embodying certain features of this invention;

Figs. 2 and 3 are cross sections on an enlarged scale as seen on correspondingly numbered planes of Fig. 1;

Fig. 4 is a horizontal section as seen substantially along plane 4—4 of Fig. 2;

Fig. 9 is a fragmentary axial sectional view of a modified form of transmission;

Fig. 10 is a cross sectional view as seen on plane 10—10 of Fig. 9;

Fig. 11 is a detail section showing one form of ratio indicator which may be used with the invention;

Fig. 12 is a plan view of the indicator of Fig. 11;

Fig. 13 is a detail section as seen generally on the plane 13—13 of Fig. 11;

Fig. 21 is a detail section of another form of ratio indicator;

Figs. 22, 23 and 24 are fragmentary sections on an enlarged scale, as seen on correspondingly numbered planes of Fig. 21;

Fig. 25 is a detail section of another form of ratio indicator;

Fig. 26 is a transverse section as seen on plane 26—26 of Fig. 25;

Fig. 27 is a detail section of another form of ratio indicator;

Figs. 28 and 29 are fragmentary sections as seen on the correspondingly numbered planes of Fig. 27;

Fig. 32 is a fragmentary elevational view of the transmission casing as seen on plane 32—32 of Fig. 1; and Fig. 33 is a diagrammatic elevational view showing different operating positions of the transmission of Fig. 1.

Figure 5:
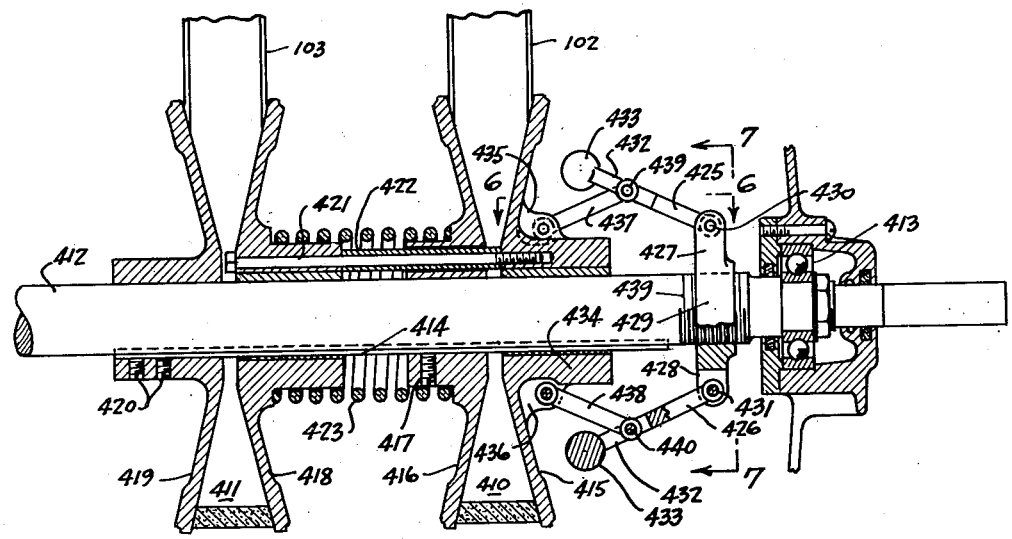
Fig. 5 is a fragmentary transverse section on an enlarged scale showing a modified form of driven pulley.

Referring to Figs. 1 to 4, a transmission is shown therein utilizing multiple belts and incorporating one form of improved adjusting mechanism. A frame generally indicated by 1 serves to support the driving motor 2 and the driven shaft 3. The frame 1 may include a housing or casing 4 serving to enclose the belts and their cooperating pulleys and supported by means of foot members or brackets 5 and 6 secured on its opposite sides. Each of these brackets has a flanged shoulder telescoping into the edges of corresponding openings in the casing 4. Each of the brackets 5, 6 also has a large opening coaxial with the driven shaft 3 and covered by closure members 7 and 8 respectively which in turn support anti-friction bearings 9 and 10 rotatably carrying the driven shaft 3. This shaft extends out of the casing at the right to facilitate coupling to a load.

The motor 2 is of conventional construction and includes a frame 13 supporting the stator 14 and having the end bell 15 which it is to be understood carries a bearing for supporting one end of the driving shaft 16. This is a common arrangement. The other end of the motor frame 13 is secured to an adapter shell 17 by means of screws 18 and cylindrical engaging surfaces indicated at 19. Similarly, the adapter 17 is secured to housing 4 by cylindrical engaging surfaces indicated at 20 and studs 21 (see Figs. 2 and 4). The adapter 17 has a boss 23 coaxial with the axis of shaft 16. In this boss is mounted an antifriction bearing 22 for supporting drive shaft 16; and it also supports the ratio adjusting mechanism generally indicated by 24, which will be described later in detail. The side of housing 4 opposite to that carrying the motor 2 is provided with an opening 25 closed by a cover member 26 carrying an antifriction bearing 27 for supporting the outer end of shaft 16.

Mounted on the drive shaft 16 are the adjustable driving pulley structures 30 and 31, these being substantial duplicates. Thus the pulley 30 has the axially fixed sections 32 and the axially movable section 33, these sections having opposed conical faces. A long key or spline 34 is provided on shaft 16 and extends through hubs 35 and 36 of pulley sections 32 and 33 respectively, thus constraining the sections to rotate with the shaft. Hub 35 is provided with set screws 37 which engage key 34 and serve to secure the section against axial movement along the shaft. Adjustable section 33 may have a suitable bearing bushing 38 inserted in hub 36 for contacting the shaft 16.

Pulley 31 has a similar axially fixed section 40, provided with a hub 41 through which key 34 passes, and held against axial movement by a set screw 42. The adjustable section 43 of pulley 31 has a long hub 44 provided with a bushing 45. The movable pulley sections 33 and 43 are joined for simultaneous movement by means of a plurality of bolts or screws, one of which is indicated at 47. Each screw 47 engages a tapped hole 48 in hub 44 and passes through a clearance hole 49 in hub 36. A counterbore 51 may be provided for head 50 if desired. A sleeve or separator 52 is provided for each screw 47, being interposed between the inner face of hub 44 and the outer end hub 36. Sleeve 52 determines the distance between pulley sections 33 and 43, screw 47 serving to clamp the sections against sleeve 52. Clearance holes 53 are provided in fixed pulley section 40 for sleeves 52.

Hub 44 has an extension 55 of reduced diameter extending to the left (Fig. 1) from a step or shoulder 56 at the end of hub 44. A combination radial and thrust bearing 57 of an antifriction type is mounted on extension 55, the inner race 58 of bearing 57 being maintained against shoulder 56 in a manner to be presently described. A bearing cage 59 is mounted on the outer race 60 of bearing 57 and has a shoulder 61 opposing shoulder 58. It will be apparent that as long as there is a force urging pulley section 43 and bearing cage 59 toward each other, bearing 57 will be confined between shoulders 56 and 61 and transmit such force from the pulley section to the bearing cage or vice versa. Such force is always present, at least when the transmission is in operation, due to the belt pull and the conical pulley faces; hence the position of cage 59 serves to determine the position of pulley section 43, and, due to connections 47, 52, the position of pulley section 33 as well.

The adjusting mechanism 24 controls and maintains the position of cage 59 relative to the other parts of the structure. Thus, a forked bell crank 65 is pivotally supported on the adapter 17. For this purpose, the crank has a hub 66 (Figs. 1, 3 and 4) through which extends a shaft, forming pintles or stub shafts 67, 68 which are rotatably supported in ears 69, 70 respectively, formed on member 17.

The downwardly extending arms 71, 72 (Fig. 3) of bell crank 65 are each provided with a slot 73 at their lower ends for receiving the diametral pins 74 on cage 59.

The other arms 75 and 76 of bell crank 65 are similarly provided with slots 77 for receiving pins 78 extending diametrically from the follower or adjusting nut 79. Nut 79 threadedly engages a lead screw 80, rotatably supported in a manner now to be described, in adapter 17 so as to extend vertically in a radial direction from shaft 16.

The lead screw 80 is guided radially by means of an anti-friction bearing 81 mounted on the reduced upper portion 82 of screw 80. As clearly shown in Figs. 1 and 2, the outer race 83 of bearing 81 is supported in a bearing cage 84 which is mounted in a suitable opening 85 in the upper part of member 17. Cage 84 has a flange 86, a number of screws as 87 serving to secure it to member 17. A hand wheel 88 is secured to the upper end 82 of adjusting screw 80 as by a set screw 89 in hub 90 of the hand wheel. The lower face 91 of hub 90 is spaced closely to the upper surface of cage 84. Thus hub 90 and bearing 81 cooperate to restrain screw 80 from axial movement.

To facilitate operation of hand wheel 88 it may be provided with a handle 92. To assist in supporting the screw 80, it has its lower extremity 93 of reduced diameter and accommodated in a suitable bore 94, formed in the upper part of hub 23 of the adapter 17. It will be readily understood that rotation of hand wheel 88 and the adjusting screw 80 will be effective to swing bell crank 65 on its pintles 67 and 68, altering the position of bearing cage 59, etc.

It is obviously desirable to provide means for setting the maximum and minimum ratio to which the transmission may be adjusted. This may be done conveniently by providing stops to limit the travel of nut 79. Thus, as shown in Figs. 2 and 4, blocks 321 and 322 are provided on opposite sides of follower nut 79. These blocks may be identical, being provided respectively with open ended slots 323, 324 terminated by stop shoulders 325, 326. Block 321 is supported by threaded engagement with a bolt or rod 327 having a long threaded portion 328 as clearly shown in Fig. 2. Bolt 327 extends through a clearance hole 329 in the upper surface of adapter 17 and has a flat sided head 330 which provides a grip for a wrench for turning the bolt 327, as well as supporting the bolt. The lower portion of bolt 327 has a threadless portion 331 of reduced diameter which is accommodated in a suitable opening in ear 332, formed on the boss 23 of adapter 17. Washers 333 and a pin 334 such as a cotter pin are so secured to portion 197 as to engage the under surface 335 of boss 332 and restrain bolt 327 from upward movement.

It will be clear that rotation of bolt 327, as by suitable means applied to head 330 will cause block 321 to move axially of bolt 327, since block 321 is kept from rotating by the engagement of pin 78 in slot 323, the direction of such axial movement depending on the direction in which bolt 327 is turned. Hence stop 325 may be adjusted to permit follower nut 79 to move upwardly a greater or lesser distance in response to rotation of lead screw 80, and this in turn determines the maximum possible separation between pulley sections 32, 33 and 40, 43 thus determining the minimum speed ratio to which the transmission can be adjusted.

Block 322 is similarly supported for vertical adjustment by means of a bolt 336, arranged in the same way as bolt 327. However block 322 has stop 326 at the lower end of slot 324, hence serving to adjustably limit the downward movement of follower nut 79. This determines the minimum possible separation between pulley sections 32, 33 and 40, 43 and hence the maximum speed ratio to which the transmission can be adjusted.

The driven or load driving shaft 3 carries pulleys 100 and 101, which cooperate respectively with pulleys 30 and 31, being connected therewith by means of belts 102 and 103. Pulleys 100 and 101 are generally similar to pulleys 30 and 31, each having a pair of facing oppositely coned sections 105, 106 and 107, 108, one section of each pair being axially fixed and the other section being axially adjustable. By having the fixed sections of pulleys 100 and 101 oppositely directed with respect to the fixed sections of pulleys 30 and 31, belts 102 and 103 are maintained in alinement for all effective pulley diameters.

Thus, sections 106 and 108 are secured on the shaft 3 by means of a long spline or key 109 and set screws 110. Similarly, the axially movable sections 105, 107 are joined for simultaneous movement by screws 111 and sleeves 112, all as in pulleys 30, 31. As a means of adjusting the movable sections, a compression spring 114 is supported coaxially with the shaft 3 between the pulleys 100 and 101, by means of hub 115 on pulley section 106 and hub 116 on pulley section 107. Spring 114 is thus confined between shoulder 117 on fixed section 106 and shoulder 118 on movable section 107, thereby urging sections 107 and 105 against the belts 103 and 102 respectively at all times.

As is well understood, in the operation of such a transmission, the spring as 114 must be capable of exerting sufficient force to prevent the pulley sections being forced apart by the pull exerted by the belt due to the normal operating load, which causes a wedging action tending to separate the sections. With the arrangement just described, a very compact design is possible; at the same time a comparatively large spring can be used.

Such an arrangement is quite satisfactory for a constant torque load, as brief consideration will show. It is apparent that as the sections of the driven pulley are forced apart to give a decreased effective pulley diameter, the spring opposing such separation is compressed, thereby exerting increased pressure on the belt. For the driven shaft to deliver a constant torque as the effective diameter of the driven pulley is decreased, the pull exerted by the belt must increase. Hence increased side pressure on the belt is desirable to ensure against slippage.

However, for a load requiring a constant horsepower, such increased belt pressure is not desirable, as will now be shown.

When the transmission is adjusted for maximum speed reduction, that is with the driving pulley at its minimum effective diameter, and the driven pulley is at its maximum effective diameter, the normal operating belt pull, and hence the force urging the driven pulley sections apart, is a maximum. Spring 114 must be able to exert sufficient force to prevent such separation when in its most expanded condition, that is with the pulley sections at minimum separation.

As the speed ratio is increased, by reduction of the effective diameter of the driven pulley, the normal belt pull and the force necessary to prevent separation of the pulley sections as a result of such pull is decreased, but due to the separation of the sections of the driven pulley to produce such reduction of effective diameter, spring 114 is compressed and exerts an increased force opposing the separation of the pulley sections when in fact less force is needed. This is not desirable, as it causes unnecessary belt wear, and renders the ratio adjustment difficult. These disadvantages are particularly noticeable in a multiple belt transmission.

Figure 6:
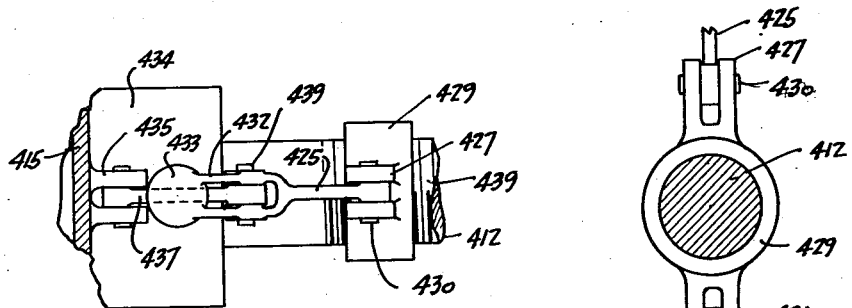
Figs. 6 and 7 are detail sections as seen on the correspondingly numbered planes of Fig. 5.
Figure 7:
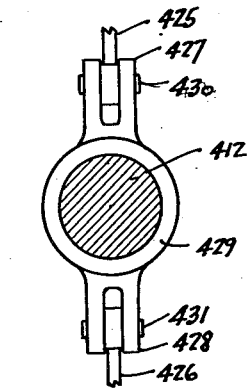

An arrangement is shown in Figs. 5, 6 and 7 by which such axial force operating on the movable pulley sections is automatically reduced as the speed of the driven shaft is increased. Fig. 5 shows a pair of pulley structures 410 and 411, which are similar to pulley structures 100 and 101 of Fig. 11 and may cooperate with belts 102 and 103 respectively. Pulley structures 410 and 411 are mounted on driven shaft 412 rotatably supported by anti-friction bearings, one of which is indicated by 413 and are secured against rotation thereon by means of a long spline or key 414. Pulley structure 410 includes the axially slidable section 415 and the fixed section 416, the latter being secured axially by a set screw 417. Similarly pulley structure 411 includes the axially movable section 418, and the section 419 axially secured by set screws 420.

The movable sections 415 and 418 are connected for simultaneous adjustment by a plurality of screws and separators one of each being shown at 421 and 422. A compression spring 423 encircles shaft 412 and is confined between the fixed pulley section 410 and the movable section 418. The arrangement is such that the spring 423 opposes separation of the cooperating pairs of pulley sections 415, 416 and 418, 419.

As the cooperating pulley sections move apart, spring 423 is compressed and opposes such separation with increased force. As just pointed out, this is objectionable for a constant horsepower load and means are provided for utilizing centrifugal force, depending in amount on the speed of shaft 412, to provide a force opposing the pressure exerted by spring 423. This means includes a pair of arms 425 and 426 pivoted respectively at one end to the diametrically extending pairs of arms 427 and 428 of a collar 429 by means of removable pins 430 and 431. Collar 429 is secured on shaft 412 as by having a threaded bore which engages screw 439 formed on the shaft.

The outer portions of arms 425 and 426 may be bifurcated as at 432 and provided with weights 433 at their ends.

Pulley section 415 has a hub 434 provided with diametrically opposite pairs of ears 435 and 436. Pivotally secured respectively between each pair of ears 435 and 436 are links 437, 438. The opposite ends of the links 437, 438 are pivoted at 439, 440 in the bifurcated portions 432 of arms 425, 426 respectively.

Rotation of shaft 412 and connected parts will cause the weighted arms 425 and 426 to have a tendency to fly outward about their pivoted supports in arms 427 and 428, in the manner of a fly ball governor, and the resultant force due is transmitted to the axially movable pulley sections by arms 437 and 438, where it urges these sections away from the cooperating fixed sections in opposition to the force exerted by spring 423. It will be plain that a reduction in the effective diameters of pulley structures 410 and 411 will cause an increase in the speed of the shaft 412 which in turn will cause an increase in this opposing force. Obviously, a similar arrangement could be used with advantage on a transmission utilizing a single belt.

The threaded connection 439 between collar 429 and shaft 412 provides means whereby the amount of force opposing spring 423 at any given speed of the shaft may be varied. Thus, by removal of pins 430, 431, arms 425, 426 may be freed from their associated arms 427 and 428, allowing collar 429 to be turned manually on shaft 412. The screw threads 439 cause the collar 429 to move toward or away from pulley section 415 depending upon the direction in which the collar is turned. This change in distance will alter the relative angular positions of the arms 425, 437, of each pair when reassembled, and 426, 438 with respect to each other, as well as to hub 434 and collar 429 for any given position of pulley section 415. This in turn alters the force exerted by weights 433 at any given speed, opposing spring 423.

It will be apparent that the adjustment of collar 429 must be by increments of half a turn in order that arms 427 and 428 on collar 429 will be in alinement with either pair of ears 435 or 436 on hub 434. By making thread 439 of a relatively small pitch, such adjustment will be sufficiently accurate. After making the adjustment pins 430 and 431 are of course replaced to secure arms 425 and 426 to the collar 429.

Figure 8:
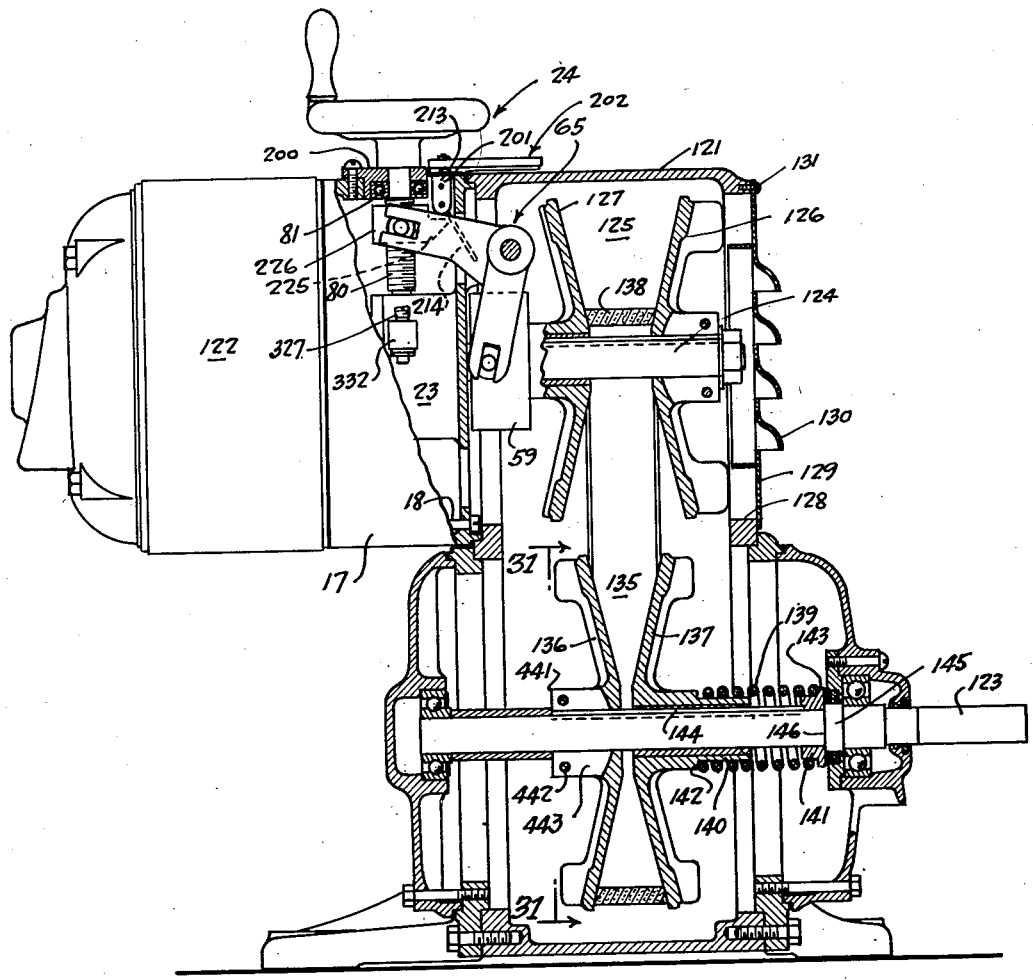
Fig. 8 is a view similar to Fig. 1 but showing a modified form of transmission.

The ratio adjusting mechanism described in connection with Figs. 1–4 may be advantageously used with single belt transmissions as well as with those using multiple belts. A single belt transmission incorporating the arrangement is shown in Fig. 8.

A housing 121 is provided as before for supporting the motor 122 and the load driving shaft 123. The motor shaft 124 carries the adjustable diameter pulley structure 125 including the axially fixed section 126 and the axially movable section 127. The axial position of this section is determined by the adjusting mechanism 24 which is identical with that used on the first form. Since with a single pulley, the overhang of shaft 124 is not great, the motor bearings suffice to carry the shaft without the use of an outboard bearing. Accordingly the opening 128 in the housing 121 may be closed by a pressed metal cover 129 provided with louvres 130 and held in place by screws 131.

The cooperating pulley 135 on driven shaft 123 has an axially fixed section 136 and an axially movable section 137 which is urged into contact with the belt 138 by means of a compression spring 139. Spring 139 is supported coaxially of shaft 123 by hub 140 on pulley section 137 and a collar 141 and is confined between shoulder 142 on hub 140 and shoulder 143 on collar 141. As before, a long key or spline 144 is provided on shaft 123 for ensuring that pulley sections 136, 137 rotate therewith, the end of this key engaging a suitable notch in collar 141, to ensure that the collar also turns with the shaft. To prevent axial movement of collar 141 due to the pressure of spring 139, shaft 123 has an enlarged portion 145 providing a shoulder 146 against which collar 141 seats.

Figure 31:
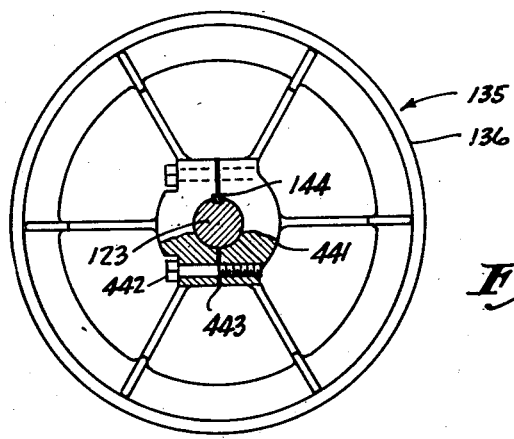
Fig. 31 is a detail section as seen on plane 31—31 of Fig. 8.

Pulley section 136 is secured against axial movement on shaft 123 by means of a split hub 441 which is clamped about the shaft by means of bolts or screws 442 (see also Fig. 31). Hub 441 is split by a diametral cut 443 which as clearly shown in Fig. 8 does not extend the full length of the hub.

From an inspection of Fig. 8, it will be apparent that the motor 122, together with the speed adjusting mechanism and driving pulley 125 is removable as a unit from the frame 121 for inspection and repair. This removal may be easily accomplished by taking the belt 138 off pulley 125, removing the nuts from studs 21 which hold adapter 17 in place (see Fig. 2) and moving the motor, adapter and attached parts axially to the left (Fig. 8).

An inspection of Fig. 1 will show that the means connecting the adjustable pulley sections for simultaneous movement, that is the bolts and sleeves 47, 52 and 111, 112, restrict the minimum effective diameter to which the corresponding pulleys 30, 31 and 100, 101 may be adjusted, since the inner surface of the belts will engage the spacer sleeves if the sections are unduly separated. This reduces the extent of the ratios which may be obtained with any given pulley diameters.

Figs. 9 and 10 illustrate an arrangement wherein such connecting means is placed outside the pulley sections, and thus allowing the minimum effective diameter which may be obtained to be substantially less and approximate the diameter of the shaft. This materially increases the speed range obtainable with any given pulleys.

In these figures is shown a fragment of a housing 150 which may be generally similar to that disclosed in Fig. 1. The housing 150 supports a motor (not shown) by means of an adapter 151, the motor shaft 152 extending across the housing and being supported by antifriction bearings 153 and 154, suitably supported on the opposite sides of housing 150. A plurality of adjustable diameter pulleys 155, 156 are shown as mounted on the shaft 152. While two such pulleys are shown, it will be plain that more than two can be used by mere duplication of parts. Since pulleys 155 and 156 are substantial duplicates only one will be described.

Thus there is an axially fixed section 157, secured as by set screw 158 in hub 159, and a long key 160 in shaft 152. The movable section 161 has a long hub 162 with a suitable bushing 163 for contacting the shaft 152. Hub 162 has a seat 164 formed thereon for receiving the inner race 165 of an antifriction radial and thrust bearing 166, a nut 167 threaded on hub 162 serving to secure race 165 in a conventional manner. The outer race 168 of bearing 166 is secured in bearing cage 169 by means of cap 170, secured to the cage 169 by screws 171. Conventional grease retainers 172 and 173 may be provided if desired. It will be clear that cage 169 is axially fixed with respect to pulley section 161, but the pulley section may rotate independently of the cage.

Means are provided connecting bearing cages 169. Thus each may have a plurality of radially extending arms 175, preferably three as shown, the cage with the arms forming a spider, corresponding arms 175 of the spiders being joined by rods 176. These rods 176 serve to prevent relative movement either axially or rotatably between the cages. The rods 176 may be conveniently secured to the arms 175 as by having a reduced threaded portion 177 at one end which engages a suitable tapped opening 178 in the arm. The other end of rod 176 has a somewhat longer threaded portion 179 that passes through a clearance hole 188, in the arm 175 of the other cage 169. Nuts 181, 182 threaded on portion 179 serve to clamp arm 175 between them. By adjusting nuts 181, 182, the relative axial position of cages and the pulley sections 161, 169 may be altered.

These rods 176 extend outside of the outer edges of the pulley sections, as shown most clearly in Fig. 10. Accordingly they do not interfere with the inward movement of the belt 500 between the pulley sections.

The axial positions of cages 169 and hence of pulley sections 161 with respect to sections 157 may be determined by means of a lead screw 185 rotatably supported by an antifriction bearing 184 in cap 186 attached to the right hand side of housing 150. A nut 187 threadedly engages screw 185 and has a plurality of arms 188. Each arm 188 carries a rod 189 secured in the arm as by a pin 190 and having its opposite end threadedly secured in cage 169 as indicated at 191. A hand wheel 192 may be secured to the outer end of rod 185 for convenient rotation of the rod. All of the rods 189 pass through guiding apertures in the right hand wall of housing 150, forming a sliding connection between the housing and cages 169, arms 175, rods 176, etc. which prevents rotation of the cages etc. about the axis of shaft 152.

It is desirable that the transmissions include means for indicating the ratio to which the transmission is adjusted. Since in most cases the motor operates at a known and constant speed, the indicating means may be arranged by suitable calibration to indicate the speed of the load driving shaft for any adjustment of the transmission.

Such an indicator may take any one of a variety of forms. One form is shown in Figs. 8, 11, 12 and 13. Therein, cap 200 (which carries bearing 81 for the lead screw 80), and adapter member 17, are arranged to provide an opening 201 on the top side of member 17 to receive a portion of the indicator 202.

Indicator 202 has a thin flat casing 203, the lower wall of which has laterally extending feet or ears 204. Screws 205 serve to secure the casing 203 to member 17. A scale member 206 carrying appropriate indicia 207 is secured in casing 203. A detachable cover 208 is provided for casing 203 and has an arcuate opening 209 through which scale 206 is visible. A pivoted pointer 210 cooperates with the scale. For pivotally mounting this pointer, it carries a stub shaft 211 which is journaled in a boss projecting from cover 208. The lower wall of casing 203 has a depending lug 213 formed thereon adapted to project through opening 201. This lug has a pair of stub shafts upon which are pivoted an actuating lever 214 and an idler lever 215. The idler 215, pivoted on the stub shaft 216, has an upwardly extending arm 217 engaging a slotted crank arm 218 on pointer 210 (see Fig. 12). Idler 215 also has a downwardly extending arm 219 carrying pin 220 which engages a slot 221 in the upper portion 222 of lever 214. This lever, pivoted on stub shaft 223, has a downward extension 224, adapted to engage a cam extension 225 on the follower nut 226 which operates bell crank 65. A light torsion spring 227 urges extension 224 against cam 225.

As nut 226 is moved toward its lower position (indicated in dotted lines, Fig. 11) which corresponds to an increase in the effective diameter of pulley 125, extension 224 will be swung to the left by spring 227 causing pointer 210 to move counterclockwise across scale 206. The extent of this movement depends on the distance through which nut 226 is moved and hence by appropriate indicia on the scale, the ratio between the adjusted pulley diameters or the resulting speed, or both, will be indicated by pointer 210. Upward movement of nut 226 will urge lever 214 and associated parts in the opposite direction against the action of spring 227. A light torsion spring 228 is provided to constantly urge pointer 210 in a clockwise direction, to prevent any looseness in the lever connections impairing the accuracy of the scale reading.

Figure 14:
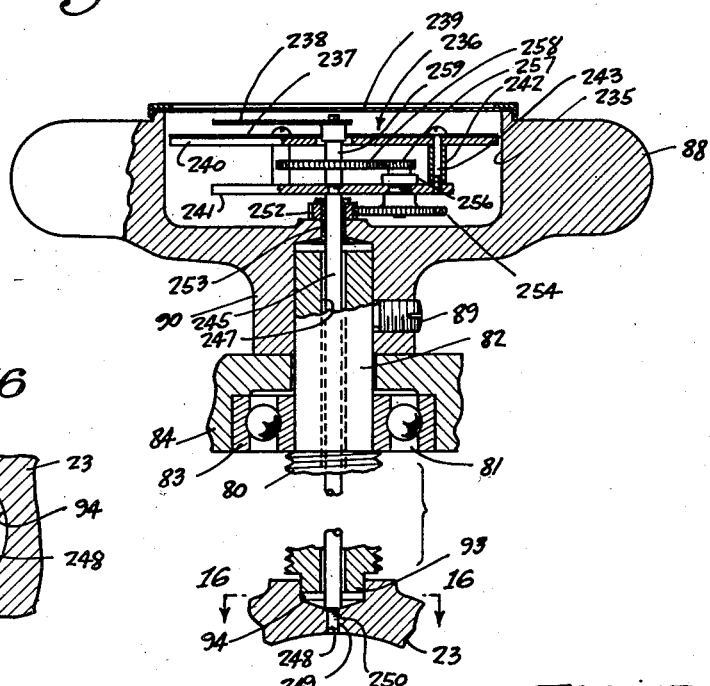
Fig. 14 is a sectional view showing another form of ratio indicator.
Figure 16:
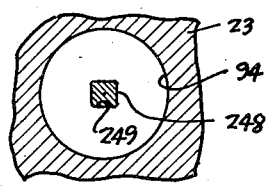
Fig. 16 is a detail section as seen on plane 16—16 of Fig. 14.
Figure 15:
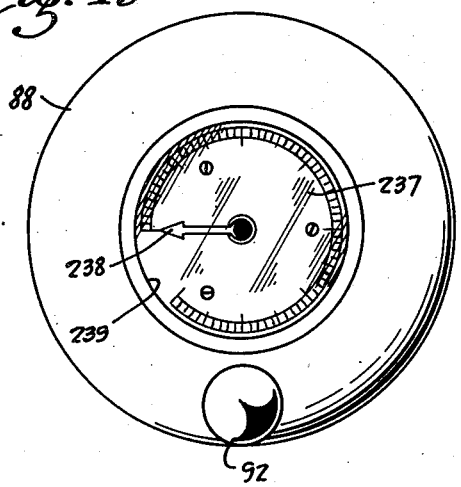
Fig. 15 is a plan view on a reduced scale of the structure of Fig. 14.

Another form of indicator is shown in connection with Fig. 1, the details thereof being disclosed in Figs. 14-17. Referring particularly to Fig. 14, it will be seen that hand wheel 88 has a deep circular axial cavity or well 235 within which is disposed the indicator 236, including a circular scale 237 and a cooperating pointer 238. Well 235 is provided with a cover member 239, having a transparent window, through which the indicator may be read.

Scale 237 is carried on a plate 240 which is attached to a frame member 241 as by a number of tubular separators 242 through which pass screws 243. Plate 241 is supported on a shoulder 244 formed near the upper end of a stationary shaft 245, coaxial with the lead screw 80. Member 241 is also splined or otherwise secured to the reduced portion 246 of shaft 245 which projects above shoulder 244, so that it will be held stationary with the shaft. Shaft 245 extends through lead screw 80, a clearance hole 247 being provided therefor, and has a squared extension 248 which enters a squared opening 249 forming an extension of bore 94 in hub 23. The shoulder 250 formed by the squared portion 248 rests on the bottom of bore 94 so that shaft 245 is supported thereon. Extension 248 may of course be splined or otherwise keyed into opening 249 so as to prevent relative rotation between shaft 245 and hub 23.

Figure 17:
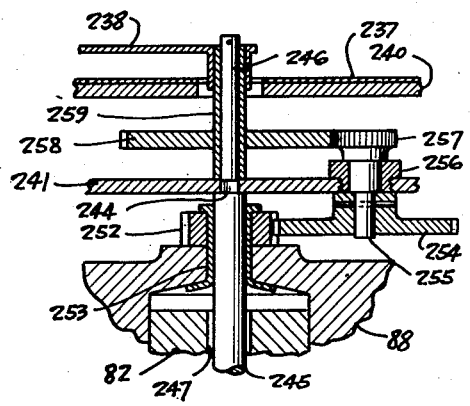
Fig. 17 is a fragmentary section on an enlarged scale of the operating mechanism of the indicator of Fig. 14.

Within well 235 and encircling shaft 245 is a pinion 252 secured to hand wheel 88 so as to rotate therewith as by a hollow rivet 253 (Fig. 17). Pinion 252 meshes with a gear 254 mounted on shaft 255. This shaft is rotatably supported by frame member 241 by means of a small bearing bushing 256. The upper end of shaft 255 has a pinion 257 secured thereon which meshes with gear 258 secured on sleeve 259. This sleeve is rotatably supported on reduced portion 246 of shaft 245. Pointer 238 is secured in an appropriate manner on the upper portion of sleeve 259 so as to rotate therewith.

The operation of this indicator is as follows. When hand wheel 88 is rotated to alter the position of nut 79, frame 240—241 and dial 237 remain stationary by virtue of their connection with member 17 through shaft 245. Rotation of the hand wheel will be imparted at a greatly reduced rate to pointer 238 by pinion 252 and the gear train 254, 257, 258, the angular movement of the pointer 238 being proportional to the angular movement of the hand wheel and hence in accordance with the movement of the follower nut 79. Hence by appropriate calibration of scale 237, the ratio or output speed of the transmission will be indicated by the pointer 238.

Brief consideration will show that several complete turns of hand wheel 88 are required to move nut 79 from one end of its travel to the other corresponding to an adjustment of the transmission through its total ratio range. On the other hand pointer 238 should make slightly less than one complete revolution, hence the need for substantial speed reduction in the gearing 252, 254 and 257, 258. The required amount of such reduction depends on the pitch of the adjusting screw 80 and on the total travel of nut 79.

Figure 18:
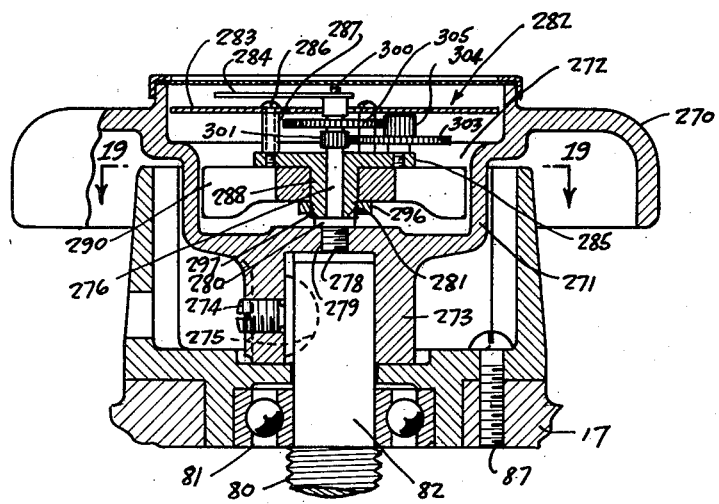
Fig. 18 is a sectional view showing still another form of indicator.
Figure 19:
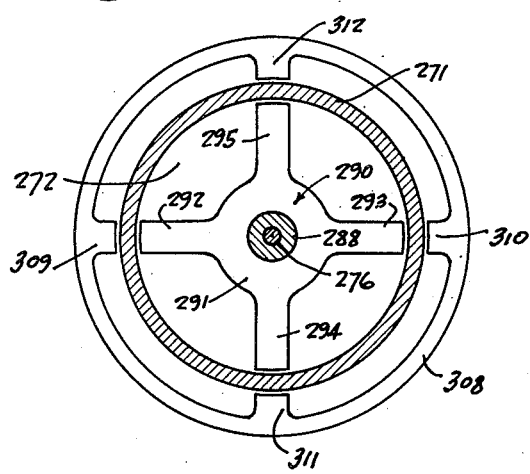
Fig. 19 is a cross section as seen on plane 19—19 of Fig. 18.
Figure 20:
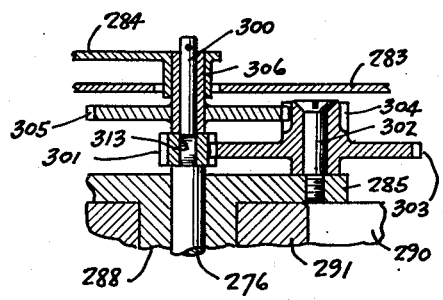
Fig. 20 is a fragmentary section on an enlarged scale of the operating mechanism of the indicator of Fig. 18.

Figs. 18, 19 and 20 show a speed indicator operating in general like that just described. In this form there is a hand wheel 270 of nonmagnetic material as brass or aluminum, which has a cylindrical wall defining a central well or cavity 272 formed by a wall 271, and terminating in a hub 273 secured on the upper portion of the lead screw 80 by a set screw 274 and key 275. A central post or shaft 276 is fixedly mounted on the bottom wall 277 of well 272 as by having its end portion 278 threadedly secured in an opening 279 in the wall 277. Post 276 has a collar 280 immediately above the threaded portion 278 which serves to limit the entry of the post 276 into opening 279 as well as providing a shoulder 281 for supporting the indicator mechanism 282.

The indicator mechanism comprises a graduated scale or dial 283 similar to dial 237 of the preceding form, and a cooperating pointer 284. Dial 283 may be in the form of an etched metal plate, secured to a member 285 in any convenient way, as by screws 286 and spacers 287. Member 285 is rotatably supported on post 276 by an integral boss 288 resting on shoulder 281.

Mounted on boss 288 and secured against rotation with respect thereto is a magnetic member 290. As shown in Fig. 19, this member 290 has a central hub 291 and an even number of symmetrically spaced arms 292, 293, 294 and 295, extending therefrom, four being the preferred number. Member 290 may be conveniently secured on boss 288 as by a nut 296 engaging the threaded extremity 297 of boss 288.

Post 276 has a portion 300 of reduced diameter extending a substantial distance above member 285 (Fig. 20). Secured against rotation on this portion 300 immediately above member 285 is a pinion 301, secured to rotate with post 276 as by having a square opening engaging a correspondingly squared portion 313 of extension 300. Rotatably supported on the upper side of member 285, as by a pin 302 threaded into member 285 is a gear 303 meshing with pinion 301. This gear 303 carries pinion 304 which in turn meshes with a gear 305 secured to a sleeve 306 rotatably mounted on extension 300 of post 276, and carrying pointer 284.

Surrounding at least that portion of well 272 occupied by member 290 is a cup 308 formed of magnetic material and having projections 309, 310, 311 and 312 corresponding in number to the arms 292 etc. of keeper 290. Either or both of the members 290, or 308 may be permanently magnetized to provide a magnetic drag between the members. For this purpose the magnetized member may be made from a high carbon or alloy steel, capable of retaining a substantial degree of magnetization.

As shown in Fig. 18, cup 308 is arranged to carry bearing 81 and it thus takes the place of cap 84, being secured to member 17 in a similar manner, as by screws 87.

When hand wheel 270 is rotated, there is magnetic drag exerted between projections 309 etc. and arms 292 etc. thus restraining member 290, member 285 and dial 283 from rotating. At the same time pinion 301 is rotated, imparting rotation to pointer 284 through gears 303, 304 and 305.

In this form of indicator, the entire mechanism is in the form of a self-contained instrument, capable of being connected to any conventional rotary actuator such as 80, that adjusts the speed. No modification of this actuator is necessary for this purpose.

The only force excepting friction, tending to cause rotation of keeper 290 etc. upon rotation of hand wheel 270, is the reaction, through gears 305, 304 and pin 302 to member 285, of the force necessary to rotate pointer 284. This force obviously will be extremely small; however, in the event that it causes some angular displacement of keeper 290 and dial 237, these will immediately be returned to their initial position by the magnetic drag between projections 309, 310 etc. and the corresponding arms 292, 293, etc. upon cessation of the rotation of the hand wheel, and a correct dial reading then may be obtained.

The corelation between the dial reading and the adjusted pulley diameter is the same as in the previously discussed form. It will be apparent that the indicators of Figs. 14 and 18 indicate in fact the number of turns which the lead screw makes from a given position, but since the position of the movable pulley section is determined by the rotation of the lead screw, the indication also is in accordance with this position. On the other hand, the indicators of Fig. 8 and the forms which will now be described depend upon the position of the follower nut or bell crank to show the position of the movable pulley section.

Figs. 21 to 24 illustrate another form of ratio indicator which is operated by movement of the follower nut. In these figures, the follower nut 340 corresponds to the follower nut 79 of the previously described forms and acts to adjust the movable section of a pulley structure (not shown) in a similar way, upon rotation of the lead screw 341, corresponding to lead screw 80. Lead screw 341 is provided with a hand wheel 342, and is radially supported by an antifriction bearing 343 mounted in a cap 344 suitably attached to the adapter member 339, similar to the adapter shell 17 of Fig. 1.

Cap 344 has a hollow lateral extension 345 opening to the right. Upon the right hand face thereof is mounted a bracket 346, pivotally carrying pointer 347 and having a scale 348 thereon for cooperation with the pointer. Bracket 346 has an ear 349 extending a short distance into extension 345 into which is threaded a pivot pin 350, upon which pointer 347 is mounted.

Pointer 347 has a tail or extension 351 extending inwardly from pivot 350. To this tail is secured a U-clamp 352 (see Fig. 24). Clamp 352 is adjustably secured in place on tail 351, by means of screw 353 and nut 354, which act to pinch the clamp together against the tail. A long screw 357 is threaded through the lower part of the clamp. A nut 358 secures it against undesired movement. The end of screw 357 is urged against the face of a lever 359 by means of a hairpin spring 360. As shown in Fig. 22, this spring encircles the pivot 350 beneath pointer 347, one end as 361 of the spring engaging the pointer, the other end 362 engaging a wall of bracket 346. Spring 360 urges pointer 347 in a counter-clockwise direction at all times, such movement being limited by the contacting of screw 357 with lever 359.

Lever 359 is formed with a loop or boss 363 at one end adapted to be clamped about the indicator operating shaft 364 as by means of a screw or rivet 365. The upper portion of shaft 364 is accommodated in a bore 366 in cap 344. A detachable plate 367 in the cap serves to support the lever 359 and shaft 364 axially, as well as providing a bearing for the shaft just below hub 363.

Shaft 364 extends downwardly parallel with lead screw 341 and passes through an opening 368 in a plate 369 secured to the upper side of nut 340. Shaft 364 is of square or fluted cross section and is twisted so that the corner or corners form a spiral. As shown in Fig. 23, opening 368 corresponds in shape with the cross section of the rod or shaft 364. Thus as nut 340 moves up or down in response to rotation of lead screw 341, shaft 364 is turned about its axis, this movement being caused to swing pointer 347 over scale 348, by lever 359, screw 357, clamp 352 and the pointer tail 351.

It is to be understood that the amount of the twist or spiralling of rod 364 is determined by the amount of travel of plate 369 and the effective lever arms of lever 359 and tail 351. However, considerable adjustment to suit different operating conditions, pulley sizes, etc. is provided by clamp 352. By loosening screw 353, the clamp may be moved along tail 351 to vary the radial distance of screw 357 with respect to pivot 350 and the axis of shaft 364. This varies the effective lever arms 359, 351 altering the extent of movement of pointer 347 for a given rotational movement of shaft 364. Further, by adjusting the projection of screw 357 with regard to tail 351, the position of pointer 347 with respect to scale 348 for any given position of nut 340 may be altered. Access to screw 357 and clamp 352 for purposes of adjustment may be had conveniently by removing screw plug 370 from the side wall of extension 345.

In that form of indicator shown in Fig. 11, the movement of the pointer for a given movement of the follower nut is not constant, but becomes continually less as the follower nut moves down. This results in a non-uniform spacing of the scale marks, as shown in Fig. 12. By providing the operating lever with an appropriately shaped cam surface to cooperate with the cam surface on the nut the pointer movement may be made substantially uniform. Such an arrangement is shown in Figs. 25 and 26. Therein, a follower nut 371 is arranged for movement by lead screw 372 as before and carries a projecting pin 373. A dial bracket 374 pivotally carries a pointer 375 having an extension or tail 376. A hair pin spring 377 is provided to urge the pointer 375 in a clockwise direction. Spring 377 may be arranged similarly to spring 360 of Fig. 22, but in reversed position. Bracket 374 carries suitable indicia (not shown) for cooperation with the pointer 375.

An operating lever 378 is pivotally carried by a pin 379 threadedly secured in a wall of the adapter member 380. Lever 378 has upper extension 381 adapted to contact tail 376, its main portion 382 being adapted to engage pin 373. The arrangement is such that spring 377 urges the pointer tail 376 against extension 381 and swings lever 378 so that at all times, portion 382 is curved to present a convex surface to pin 373. Thus, as pin 373 moves up and down with nut 371, lever 378 is caused to swing about its pivot 379, and this movement is imparted to pointer 375.

By appropriately proportioning the curve of portions 382, equal increments of vertical movement of nut 371 will cause equal increments of angular movement of lever 378 and hence of pointer 375. Thus, the marks of the cooperating scale can be uniformly spaced. Obviously, it would be possible to arrange the curve of lever arm 382 so that the movement of pointer 375 is such as to compensate in a desirable manner for irregularities in the transmission adjustment. Also this curve may be appropriately altered to give full scale movements to pointer 375 for different amounts of travel of nut 371.

Figs. 27, 28 and 29 show still another form of speed indicator. A dial bracket 385 is provided as before, and pivotally supports a pointer 386 for cooperation with scale 387. The inner end or tail 388 of pointer 386 is connected by a flexible cord 389 to one arm 390 of bell crank 391, this latter corresponding to bell crank 65 of Fig. 1 and serving in the same way to transmit motion from the follower nut 392 to the movable pulley section or sections (not shown).

To change the vertical movement imparted to cord 389 by bell crank arm 391 to the horizontal movement required by pointer 386, cord 389 passes over a horizontal rod 393 (Figs. 28 and 29) supported by cap 394. By allowing cord 389 to slide freely on rod 393 in an axial direction as the ends of the cord are swung respectively by the levers about their centers the need of a pair of idlers over which the cord would be passed is obviated. Thus referring to Figs. 27 and 28, as pointer 386 is swung from one extremity of the scale to the other in response to movement of bell crank arm 390 from its upper to its lower position, cord 389 will move between the position indicated by full lines and those indicated by broken lines at 395 and 396.

To alter the travel of pointer 386 with respect to the movement arm 390, one end of cord 389 is secured to a member 397 which embraces tail 388 and is clamped thereon by means of a set screw 398. Access to set screw 398 may be had by removing screw plug 399 from the wall of cap 394. Additional adjustment is provided by altering the position of the cord support rod 393.

Referring to Figs. 28 and 29, it will be seen that rod 393 is attached eccentrically to its supporting stud 400 by means of a crank arm 401. Stud 400 is freely rotatable in the wall of cap 394, and may be locked against rotation by means of a nut 402 threaded on stud 400. The outer end of the stud is provided with a kerf or slot 403 for reception of a screw driver.

When it is desired to adjust the position of bar 393, nut 402 is loosened and stud 400 rotated about its axis, by means of an appropriate tool inserted in kerf 403, to bring pointer 386 into the desired position with respect to arm 390 in an obvious manner. A spring 404 is provided to urge pointer 386 in a counterclockwise direction, for maintaining cord 389 taut at all times.

Figure 30:
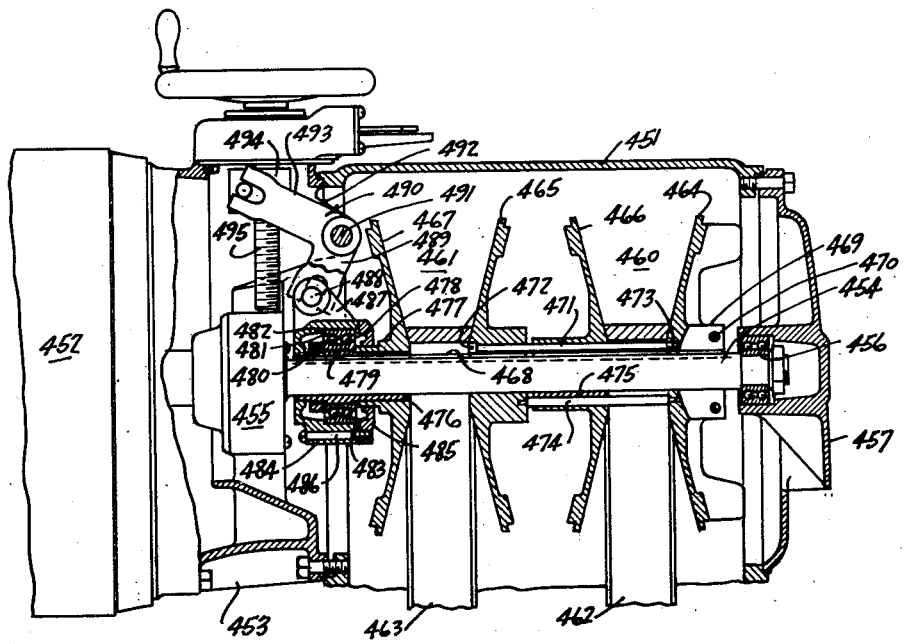
Fig. 30 is a section similar to Fig. 1 but showing another modified form of transmission.

Figure 30 shows another modification of ratio adjusting mechanism. Therein, a casing 451 is shown for enclosing and supporting the mechanism, casing 451 serving to support a motor 452 by means of an adapter 453, in a manner generally similar to that of the previous modifications. The motor has a shaft 454 which extends substantially through the casing 451, and is supported by means of an antifriction bearing supported in a cage 455 carried by adapter 453, as well as an outboard bearing 456, which may also be of an antifriction type, suitably supported in cover member 457 mounted on the side of casing 451 opposite the motor 452.

Shaft 454 carries a pair of adjustable diameter pulley structures 460 and 461, each of which cooperated respectively by belts 462 and 463 with driven pulleys (not shown) which may be arranged similarly to pulleys 100 and 101 of Fig. 1. Each of the driving pulleys 460, 461 has respectively axially fixed sections 464, 465, and axially movable sections 466 and 467. The sections are all caused to rotate with the shaft by means of a long key 468. The fixed sections 464 of the outside pulley 460 is secured against moving axially on the shaft 454, by having a split hub 469 clamped on the shaft by means of bolts 470, in the manner shown in connection with Fig. 8. The other fixed section 465 is axially secured to section 464 by means of screws, one of which is indicated by 471, each having a head 472 engaging section 465 and being threaded into hub 469 of section 464 at 473, and separators, one of which is indicated at 474. It is to be understood that there is preferably an equal number each of screws and separators, and that they are equi-angularly spaced about shaft 454.

The adjustable sections 466 and 467 are similarly secured against relative axial movement, so that adjustment of section 467 causes simultaneous adjustment of section 466. Section 466 is carried on shaft 454 by means of a bushing 475 of bronze or like wear-resisting material. Section 467 is similarly carried by a bushing 476 which extends a substantial distance beyond the hub 477 of the section 467 and carries a double thrust bearing 478. The inner race 479 of bearing 478 is clamped on bushing 476 against the end of hub 477, by means of a hub 480 threaded on bushing 476. The outer race 481 of bearing 478 is clamped between shoulders 482 and 483, formed respectively in bearing cage 484 and cap 485 therefor. Cage 484 and cap 485 are secured together by means of screws, one of which is shown at 486. The arrangement is such that any axial movement of cage 484 will be imparted to pulley section 467; at the same time the pulley section as well as shaft are freely rotatable within the cage.

Means are provided for axially positioning cage 484. Thus, the cage carries an upwardly extending lug 487 having a pin 488 arranged to be engaged by the forked ends of arms 489 of a bell crank 490. Bell crank 490 is pivotally carried at 491 by suitable projections 492 on adapter 453. The other arms 493 of bell crank 490 is operatively connected with a nut 494 arranged to be moved by rotation of lead screw 495.

The general arrangement of bell crank 490 and the adjusting mechanism is quite similar to that of bell crank 65 of Fig. 1. By locating the operating connection 488 on top of the cage, it is possible to use a shorter vertical arm on bellcrank 490, as compared with the arrangement of Fig. 1. This gives a more favorable leverage connection between the nut 494 and the cage 484 so that less force need be exerted on lead screw 495 to adjust the pulley diameter. In that form of the invention shown in Fig. 30, the motor 452, speed adjusting mechanism and driving pulleys 460 and 461, may also be removed as a unit, as described in connection with Fig. 8, since the outboard bearing 456 is secured on the shaft 454, and may be removed from its support in cover member 457 by movement toward the left.

Another important feature of the adjusting means is the arrangement shown in connection with that form of the invention exemplified in Fig. 1, whereby the angular position of the axis of hand wheel 88 may be adjusted about the motor shaft 16. By referring to Fig. 4 it will be noted that studs 21 which serve to attach the adapter 17 carrying the adjusting mechanism 24, to casing 4, are located on a bolt circle concentric with shaft 16, and are spaced 22½° above and below the horizontal center line.

The face of casing 4 upon which the adapter 17 is secured is provided with a plurality of tapped holes 502, on a corresponding bolt circle and spaced 45° about the entire circle. Thus, the stud holes in adapter 17 will aline with the holes 502 for positions of the adapter differing by 45° from the position shown. By removing studs 21, it is thus possible to rotate the adapter 17 through an angle of either 45° or 90°, clockwise or counterclockwise, from the position of Fig. 4 and resecure it to the casing, the studs 21 reengaging pairs of holes spaced 45° or 90° from that pair originally occupied. Fig. 33 illustrates diagrammatically the various positions any one of which the hand wheel 88 may be arranged to occupy.

In addition to the various positions which the hand wheel may be arranged to occupy, the casing 4 is supported on brackets 5 and 6 by means of telescoping cylindrical surfaces indicated by 503 and 504 respectively. Bolts 505, 506 serve to secure the brackets 5 and 6 to casing 4. As shown in Fig. 33, such bolts are equally spaced about the axis of driven shaft 3, hence by removing these bolts, it is possible to adjust the casing 4 angularly about the axis of shaft 3 by increments equalling the bolt spacing and then to replace the bolts and secure it in adjusted position.

Such an arrangement, whereby the casing may be angularly adjusted about the driven shaft is described and claimed in U. S. Patent #2,189,294 issued on February 6, 1940, to George T. Pfleger and assigned to the assignee of the present application.

By combining the features of being able to alter the angular position of hand wheel 88, with the adjustability of the angular position of the transmission casing 4, it is possible to provide a transmission which may be adapted to suit a wide variety of operating space requirements, and at the same time ensure that the ratio adjusting hand wheel 88 will be in an accessible position.

What is claimed is:

1. In an adjustable ratio transmission, including a pulley structure having a pair of relatively axially movable pulley sections with opposed conical belt engaging faces, forming by relative axial adjustment variable effective pulley diameters, a shaft for said structure, and a frame for supporting said shaft, the combination therewith of means for altering the relative axial positions of said pulley sections comprising a lead screw extending transversely to said shaft, a follower nut threadedly carried by said screw, means forming an operating connection between said nut and one of said pulley sections, whereby movement of the nut causes corresponding movement of said section, and means for limiting movement of said nut in one direction comprising a block having a slot closed at one end and open at the other end, a pintle on said nut slidable in said slot, and adapted to engage the closed end thereof, thereby stopping further movement of the nut, and means forming a support for said block, said means permitting adjustment of said block in the direction of travel of said nut.

2. In an adjustable ratio transmission, including a pulley structure having a pair of relatively axially movable pulley sections with opposed conical belt engaging faces, forming by relative axial adjustment variable effective pulley diameters, a shaft for said structure, and a frame for supporting said shaft, the combination therewith of a lead screw disposed transversely of said shaft, a follower nut on said lead screw, means forming an operating connection between said nut and one of said sections, whereby movement of the nut along the lead screw causes corresponding movement of said section, and means to limit the travel of said nut comprising, a pair of blocks disposed on opposite sides of the lead screw, each having an open ended slot, one of said slots being closed at its upper end, the other slot being closed at its lower end, means on said nut slidable in said slots and adapted to respectively engage the closed ends of said slots, thereby checking further movement of said nut, and means for supporting each of said blocks, said means permitting adjustment of the block in the direction of travel of the nut.

3. In an adjustable ratio transmission, including a pulley structure having a pair of relatively axially movable pulley sections with opposed conical belt engaging faces, forming by relative axial adjustment variable effective pulley diameters, a shaft for said structure, and a frame for supporting said shaft, the combination therewith of a lead screw disposed transversely of said shaft, a follower nut on said lead screw, means forming an operating connection between said nut and one of said sections, whereby movement of the nut along the lead screw causes corresponding movement of said section, and means to limit the travel of said nut comprising, a pair of stops disposed on opposite sides of the lead screw, means on the nut cooperating with the stops, one of said stops serving to check movement of the nut in one direction, the other stop serving to check movement of the nut in the other direction, and means to independently adjust said stops in the direction of movement of the nut.

4. In a adjustable ratio transmission, a pulley structure including a pair of relatively axially movable pulley sections having opposed conical belt engaging faces, forming by relative axial adjustment, variable effective pulley diameters, a shaft on which said structure is mounted, said shaft having a long key engaging said sections to prevent relative rotation between said sections and the shaft, means securing one of said sections against axial movement on the shaft, spring means urging the other section toward said section, a collar on the shaft spaced from said other section, said spring being confined between the said other section and the collar, said collar having a recess for receiving the end of the key, and means forming a shoulder on the shaft preventing axial movement of the collar in response to the force of said spring.

5. In a variable ratio transmission mechanism, a rectilinearly movable actuator for mechanically varying said ratio, and means for limiting movement of said actuator, comprising a stop member, a threaded support for said member and capable upon rotation to adjust the position of said member, and an abutment carried by said actuator said stop member having means forming a guide terminating in a shoulder and engaged by said abutment, to stop rectilinear movement of the actuator as well as to prevent rotation of the stop member.

6. In a variable ratio transmission mechanism, a lead screw, a nut actuated by said lead screw for mechanically varying said ratio, and means for limiting the movement of said nut, comprising a stop member, a threaded support for said member, and capable upon rotation to adjust the position of said member, and an abutment carried by said nut said stop member having means forming a guide terminating in a shoulder and engaged by said abutment, to stop axial movement of the nut as well as to prevent rotation of the stop member.

7. In a variable speed mechanism including a driving shaft, a load driving shaft, pulley structures respectively mounted on said shafts, and a belt operatively connecting said structures: a frame supporting the mechanism, an electric motor operatively connected to said driving shaft and mounted on the frame, said driving pulley including a pair of relatively axially adjustable sections with opposed inclined belt engaging faces, forming by relative axial adjustment variable effective pulley diameters, a lead screw for adjusting said sections, and means supporting the lead screw on the frame between the motor and the driving pulley.

8. In a variable speed mechanism including a driving shaft, a load driving shaft, pulley structures respectively mounted on said shafts, and a belt operatively connecting said structures: a frame supporting the mechanism, an electric motor operatively connected to said driving shaft, and mounted on the frame, said driving pulley including an axially fixed section and an axially adjustable section, said pulley sections having opposed inclined belt engaging faces, forming by relative axial adjustment variable effective pulley diameters, the adjustable pulley section being adjacent the motor, a lead screw for adjusting said adjustable pulley section, and means supporting said lead screw between said pulley section and the motor.

9. In a variable speed mechanism including a driving shaft, a load driving shaft, pulley structures respectively mounted on said shafts, and a belt operatively connecting said pulley structures, said driving pulley structure including a pair of relatively axially adjustable pulley sections having opposed inclined belt engaging faces, forming by relative axial adjustment variable effective pulley diameters: a frame supporting the mechanism, an electric motor operatively connected to said driving shaft, an adapter secured on said motor, means for adjusting said pulley sections mounted on said adapter, and means detachably securing said adapter to the frame whereby the adapter, the motor, and the pulley adjusting means are removable as a unit from the frame.

10. In a variable speed mechanism including a driving shaft, a load driving shaft, pulley structures respectively mounted on said shafts, and a belt operatively connecting said pulley structures, said driving pulley structure including a pair of relatively axially adjustable pulley sections having opposed inclined belt engaging faces, forming by relative axial adjustment variable effective pulley diameters: a frame supporting the mechanism, an electric motor operatively connected to said driving shaft, an adapter secured on said motor, a lead screw for adjusting said pulley sections mounted on said adapter and having an axis transverse to the driving shaft, said adapter and said frame having interengaging circular surfaces coaxial with said shaft, whereby the adapter may be rotated with respect to the frame to adjust the angular position of the lead screw about the shaft, and means to secure the adapter in adjusted position on the frame.

FREDERICK O. LUENBERGER.